UNITED STATES PATENT OFFICE.

DAVID MULQUEEN, OF RIDGWAY, PENNSYLVANIA.

MIXTURE FOR HEALING PUNCTURED TIRES.

SPECIFICATION forming part of Letters Patent No. 667,722, dated February 12, 1901.

Application filed November 10, 1900. Serial No. 36,055. (No specimens.)

*To all whom it may concern:*

Be it known that I, DAVID MULQUEEN, a citizen of the United States, residing at Ridgway, in the county of Elk and State of Pennsylvania, have invented certain new and useful Improvements in Mixtures for Healing Punctured Tires; and I do hereby declare the following to be a full, clear, and exact description of the invention, such as will enable others skilled in the art to which it appertains to make and use the same.

This invention provides an effective and cheap preparation for stopping punctures and breaks in tires of the pneumatic type and is cleanly to handle, quick-setting, and lasting in results.

The mixture consists of the following ingredients in about the proportions stated— *i.e.*, wheat-flour, ten pounds; Portland cement, four pounds; lampblack, one-half pound; water sufficient to make a solution the consistency of cream. This mixture is pumped or otherwise introduced into the tire, about half a pint to each tire, and is distributed therein, after which the tire is inflated, when the puncture, cut, or like wound will be healed.

Having thus described the invention, what is claimed as new is—

The preparation for healing punctured tires consisting of wheat-flour, Portland cement, lampblack and water in about the proportions specified.

In testimony whereof I affix my signature in presence of two witnesses.

DAVID MULQUEEN. [L. S.]

Witnesses:
    JOHN G. HEISER,
    J. H. SHANHACHER.